// United States Patent [15] 3,644,681
Rice [45] Feb. 22, 1972

[54] CORDLESS TELEPHONE SYSTEM

[72] Inventor: Dale E. Rice, Panorama City, Calif.

[73] Assignee: Cardwell Oil Corporation Ltd. (N.P.L.), Vancouver, B.C., Canada

[22] Filed: Feb. 10, 1969

[21] Appl. No.: 798,090

[52] U.S. Cl. ....................179/41 A
[51] Int. Cl. ....................H04q7/04
[58] Field of Search ....................179/41 A, 81 B; 325/8, 5

[56] References Cited

UNITED STATES PATENTS

| | | | |
|---|---|---|---|
| 1,353,612 | 9/1920 | Reeves | 179/90 |
| 1,668,270 | 5/1928 | Farrington | 325/8 |
| 2,894,121 | 7/1959 | Phillips | 179/41 UX |
| 3,366,880 | 1/1968 | Driver | 179/41 |
| 3,459,899 | 8/1969 | Lane et al. | 179/81 |
| 1,148,912 | 8/1915 | Lundell | 179/90 |
| 2,488,153 | 11/1949 | Wiener | 179/41 UX |
| 2,680,154 | 6/1954 | Dorff | 325/57 |
| 2,766,324 | 10/1956 | Peth | 325/57 |

*Primary Examiner*—Kathleen H. Claffy
*Assistant Examiner*—Thomas L. Kundert
*Attorney*—Albert L. Gabriel

[57] ABSTRACT

A telephone system wherein the portable unit appears and functions the same as a conventional telephone, but is cordless, with no direct electrical or mechanical connection to the telephone lines, and is accordingly fully mobile, as for example to any desired place within a home or office. A telephone line termination or base unit forming a part of the system connects to the telephone line, being fully compatible with existing telephone line and central office equipment, and is coupled to the portable unit through a duplex radio system. The radio transmitter of the portable unit is keyed on by the hook-switch, and relay means in the base unit is actuated in response to this carrier frequency to connect the base unit to the telephone line and key on the base unit transmitter, thereby establishing a complete DC path for signalling and a complete audio path for conversation.

5 Claims, 8 Drawing Figures

INVENTOR.
DALE E. RICE
By Huebner & Worrel
ATTORNEYS.

INVENTOR.
DALE E. RICE
By Huebner & Worrel
ATTORNEYS.

INVENTOR.
DALE E. RICE
By Huebner & Worrel
ATTORNEYS.

INVENTOR.
DALE E. RICE
By Huebner & Worrel
ATTORNEYS.

INVENTOR.
DALE E. RICE
By Huebner & Worrel
ATTORNEYS.

INVENTOR.
DALE E. RICE
By Huebner & Worrel
ATTORNEYS.

INVENTOR.
DALE E. RICE
BY Huebner & Worrel
ATTORNEYS.

CORDLESS TELEPHONE SYSTEM

BACKGROUND OF THE INVENTION

The conventional subscriber telephone requires that the portable portion thereof be connected to the telephone line wall or floor outlet by means of a multiple wire electrical cord which may include as many as six individual wires. This cord is generally relatively short and thus usually closely restricts the area of use of the telephone to a particular desk, table, shelf or the like. While a long cord can in some instances be used, as for example cord up to about 25 feet in length, such an extended cord is cumbersome and becomes easily tangled, and still generally restricts the use of the telephone to a single room or to closely adjoining areas of the home or office. The physical restrictions thus imposed by the conventional telephone cord generally require the installation of a plurality of separate telephone instruments where it is desirous to have effective telephone operation in several different rooms, or on separate desks, or otherwise in separate areas of home or business.

Because of these and other disadvantages associated with the conventional telephone cord connection, it has long been recognized as desirable for the movable or portable portion of the telephone, which includes the handset, to be completely free of the usual cord or other direct mechanical or electrical connection with the base portion of the telephone that is connected to the line, so that the movable portion of the telephone is truly portable and unrestricted. In this regard, it is also recognized as desirable that electromagnetic coupling be provided between the base and portable units of such a cordless telephone of sufficient range to allow the portable unit to be used at any position over a substantial area, as for example throughout a house, business office, shop or the like.

However, prior attempts to provide such a cordless telephone have been generally unsatisfactory for a variety of reasons, the cumulative effect of which has heretofore prevented any cordless systems from coming into general usage.

One problem in connection with prior art attempts to provide a cordless telephone system is the difficulty of providing such a system which is fully compatible with telephone line and central office equipment, and the consequent difficulty of convincing telephone companies that they should accept the use of any particular cordless telephone system in connection with their equipment.

Another problem has been the difficulty of coupling from the conventional two-wire telephone line system to the four-wire system required for voice transmission and reception both ways. This coupling problem, and the compatibility problem, include the difficulties of impedance matching, line polarity accommodation, and the like.

Another problem in the provision of a cordless telephone system is that switching has tended to be complex and expensive in both the portable and the base units, switching being required, among other things, to control the telephone line connection, hookswitch operation, dial pulsing, and keying of respective transmitters in the portable and base units. Such switching problems in connection with cordless telephone proposals have generally resulted in proposed devices which are complicated and inconvenient in operation, requiring more than the simple lifting of the handset for the operation thereof.

In general, these problems have been so severe that prior to the present invention proposed cordless telephones have been too complicated, inconvenient to operate, expensive and bulky, and also insufficiently compatible with telephone line and central office equipment, for either the subscribers or the telephone companies to find them practical.

SUMMARY OF THE INVENTION

In view of these and other problems associated with prior art proposals for cordless telephone systems, it is a general object of the present invention to provide a novel cordless telephone system which on the one hand is particularly desirable for the subscriber in that it permits operation of a portable telephone instrument which appears externally to be a standard telephone and is operated in the same manner as a standard telephone, yet which has no cord or other physical connection to a wall or floor outlet but is fully mobile over a substantial area, such as a house, office or other business area, and on the other hand is fully compatible with existing telephone line and central office equipment, being easily coupled to the usual two-wire telephone line without regard to polarity, being properly impedence matched to the line, and being simple and reliable mechanically, with particularly simple switching means embodied therein.

Briefly, the cordless telephone system of the present invention includes a stationary base unit that is operatively connected to the telephone line, and a portable or cordless unit having the usual support body with cradle and dial, and handset that is connected with this body by means of a cord and is removably supported in the cradle. The base unit and the portable unit each contain a radio transmitter and receiver, the portable unit transmitter and base unit receiver being on one frequency and the base unit transmitter and portable unit receiver being on a separate frequency, while the portable and base units each include a diplexer so that only a single antenna is required for each. These antennas may, of course, be located entirely within the housing structures for the portable and base units.

Power may be supplied for the base unit from the usual commercial AC source, rectified to suitable DC voltages for operation of the base unit components. Electrical power is supplied to the portable unit by a suitable replaceable dry cell or rechargeable battery mounted in the support body of the portable unit.

When the handset of the portable unit is on its cradle, thus opening the hookswitch, the portable unit may be in a completely inoperative condition, so that no current is drawn from its battery. The only module of the entire device which need remain operative to await calls is the base unit receiver, which draws only a very small amount of current. The only thing necessary to completely activate the system is to simply lift the handset off of the cradle. This provides power to the portable unit transmitter, and the carrier wave then emitted from this transmitter is picked up by the continuously operative base unit receiver causing actuation and closing of a relay in the base unit which connects the base unit to the telephone line and turns on the base unit transmitter, thereby establishing a complete DC path for signaling and a complete audio path for conversation. Closing of the hookswitch in the portable unit, in addition to turning on the portable unit transmitter, also turns on the portable unit receiver, so that voice transmission and reception is operative both ways.

The dial pulsing contacts in the portable unit simply break the power to the portable transmitter in pulses corresponding to the number dialed, and the base unit carrier operated relay simply follows these pulses and breaks the telephone line connection accordingly, thus simulating a standard telephone in dialing. After dialing has been completed, the portable unit transmitter and receiver both remain on while the handset is off the cradle, and continued reception of the portable unit-transmitted carrier wave by the base unit causes the carrier operated relay in the base unit to remain closed so that the entire system is operative for two-way voice communication.

Upon completing the conversation, the subscriber returns the handset to its cradle, thus turning off power to the cordless transmitter and receiver, termination of the cordless transmitter carrier wave dropping the carrier-operated relay in the base unit so as to turn off the base transmitter and return the telephone line to an idle condition to await further calls from the cordless unit or other standard telephones on the same line.

Further objects and advantages of the present invention will appear during the course of the following part of the specification, wherein the details of construction and mode of operation of a presently preferred embodiment are described with reference to the accompany drawings, in which:

DETAILED DESCRIPTION

Figure 1:
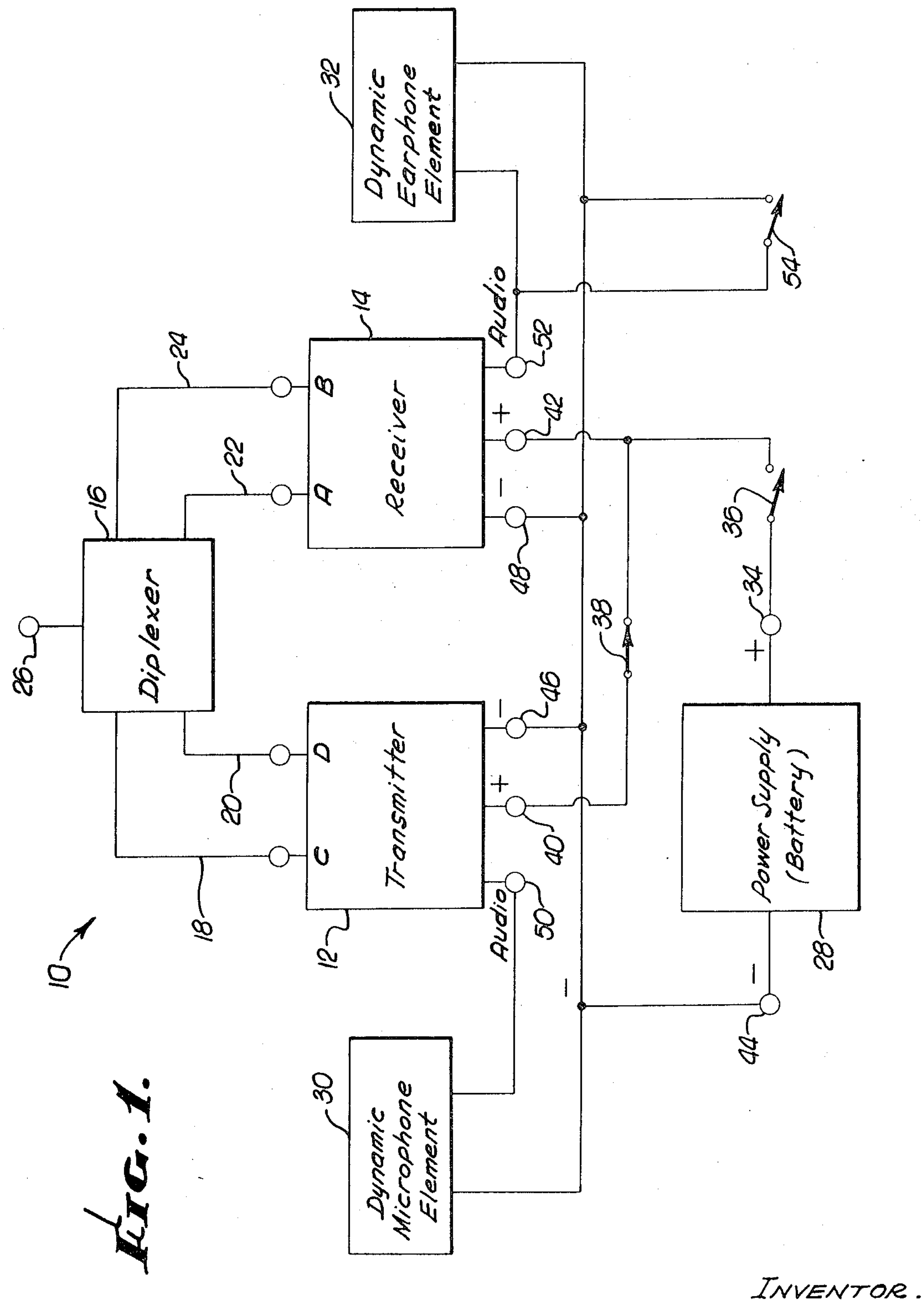
FIG. 1 is a block diagram of the portable or cordless unit of the invention.

Reference will first be made to FIG. 1 of the drawings, which illustrates in block diagram form the portable or cordless unit forming a part of the present invention. The cordless unit is generally designated by the reference numeral 10, and includes a transmitter 12, a receiver 14, and a diplexer 16 coupled to the transmitter through connections 18 and 20, and to the receiver through connections 22 and 24, so as to allow the use of a single antenna which is coupled to the diplexer through connection 26.

The portable unit is powered by a suitable battery 28, preferably 12-volt, which may be a dry cell, or may be a rechargeable battery such as a nickel-cadmium or lead oxide or other rechargeable battery.

A dynamic microphone element 30 and a dynamic earphone element 32 are also included in the portable unit 10, both of these being part of the handset. The microphone element is of the dynamic type instead of the usual carbon element type because sufficient output is obtained with the gain in the transmitter with much less overall current draw from the battery. The positive terminal 34 of the battery is connected to one side of hookswitch 36, the other side of which is connected through dial pulsing contacts 38 to the positive power input terminal 40 of the transmitter 12, and is also connected to the positive power input terminal 42 of the receiver 14.

The negative terminal 44 of battery 28 is connected to one side of microphone element 30, one side of earphone element 32, and the negative power input terminals 46 and 48 of the transmitter 12 and receiver 14, respectively. The other side of microphone element 30 is connected to audio input terminal 50 of transmitter 12, while the other side of earphone element 32 is connected to audio output terminal 52 of receiver 14. Dial off normal or muting contacts 54 are connected across the earphone element 32 so as to short out the earphone against the clicks of the dial pulse contacts 38 whenever the dial is cocked off of its normal position for dialing.

The hookswitch 36 is normally open, and automatically closes when the receiver is lifted up off of the cradle of the portable unit 10. Closing of hookswitch 36 applies the electrical power of battery 28 to both the transmitter 12 and receiver 14. However, the connection from battery 28 to transmitter 12 through hookswitch 36 also includes as a series component thereof the dial pulsing contacts 38, so that dialing will cause pulsing of the carrier wave put out by the transmitter 12 through diplexer 16 to the antenna.

It will be apparent from the block diagram of FIG. 1 that the portable or cordless unit 10 is operated in exactly the same manner as the conventional subscriber telephone except for the added feature of full mobility because of the lack of any mechanical connection with the base unit. Thus, the system is activated simply by lifting the handset and thereby closing the hookswitch 36, and normal dialing, talking and listening are permitted. When the handset is again replaced upon the cradle at the end of a conversation, opening of hookswitch 36 provides complete open-circuiting of the battery 28, so that the battery will not be depleted when the telephone system is idle.

Figure 2:
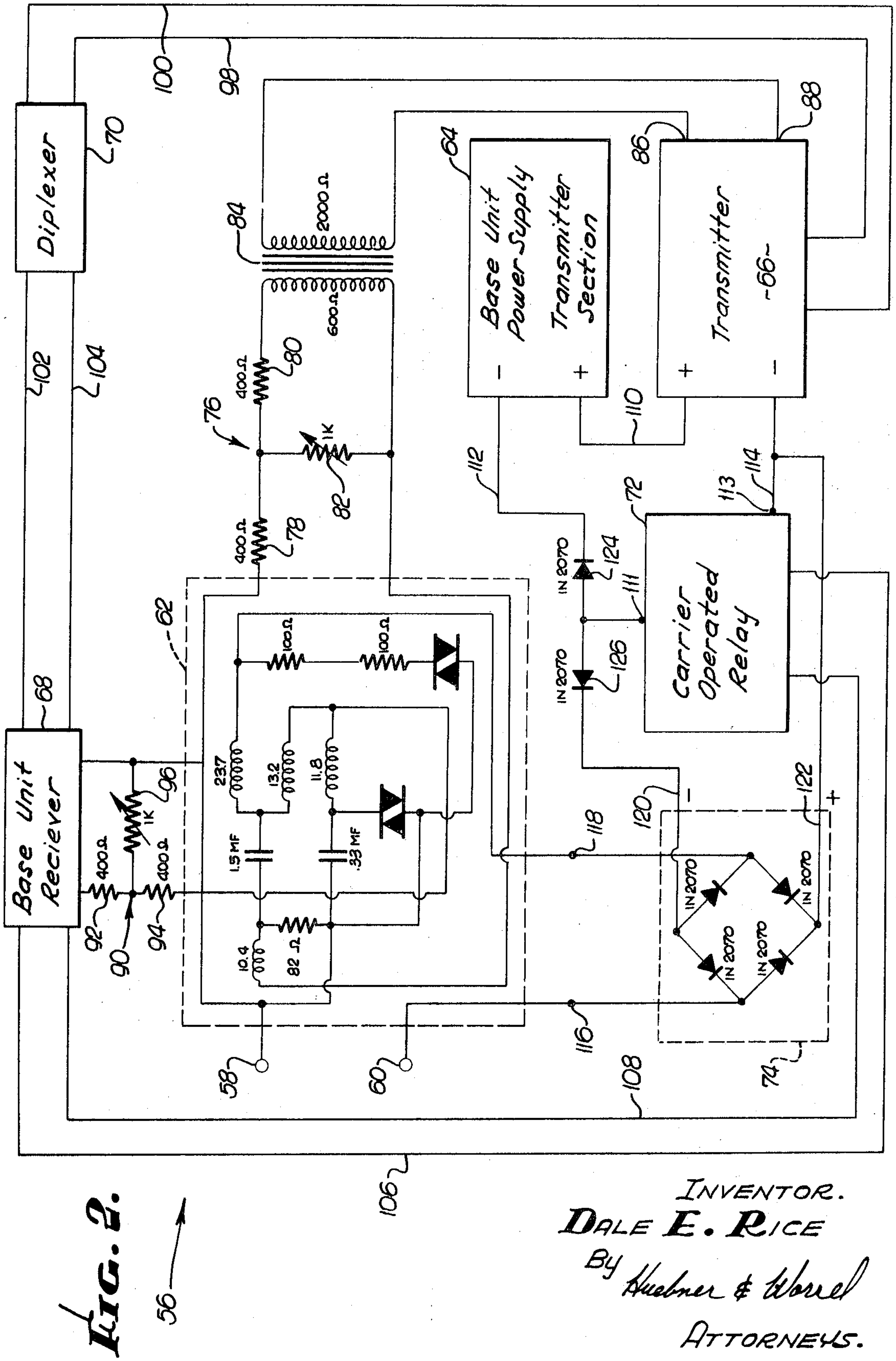
FIG. 2 is a wiring diagram, partly in block form, of the telephone line termination or base unit of the invention.

Reference will now be made to FIG. 2 which illustrates the line termination or base unit portion of the invention. The base unit as a whole is designated by the reference numeral 56, and the major components thereof include a pair of terminals 58 and 60 for electrical connection with the two telephone line conductors, an antisidetone network 62, power supply 64, transmitter 66, receiver 68, diplexer 70, carrier operated relay 72, and diode bridge network 74.

The telephone line conductors are coupled to the antisidetone network 62 through the terminals 58 and 60. The antisidetone network 62 is conventional, and accordingly the details of structure and operation will not be described herein. The antisidetone network 62 provides a hybrid function for coupling from a two-wire system to a four-wire system, and provides impedance matching, click suppression, and level control, as provided in a normal land line telephone. The antisidetone network 62 feeds audio signal coming in off the telephone line through a T-pad circuit generally designated 76 consisting of resistors 78, 80 and 82, and transformer 84, for level control and isolation, into the base station transmitter 66 through audio input terminals 86 and 88 of the transmitter 66. In this manner, voice coming in from the line is fed to the transmitter 66 for transmission from the base unit 56 and consequent reception in the portable unit 10.

The base unit receiver feeds voice signals which it receives from the transmitter of the portable unit 10 through another T-pad 90, which includes resistors 92, 94 and 96, to the antisidetone network 62, from which it passes out on the telephone line.

The transmitter 66 and receiver 68, operating on separated frequencies, are enabled to use a common antenna by means of the diplexer 70, which is connected to transmitter 66 through conductors 98 and 100, and is connected to receiver 68 through conductors 102 and 104.

The carrier operated relay 72 is normally open, but is energized and hence closed in response to a carrier signal from the portable unit 10 which is amplified in the base unit receiver 68 and provided to the relay 72 through suitable electrical conductors 106 and 108, one of which may represent ground or negative power supply potential. The positive terminal of the transmitter section of power supply 64 is connected to transmitter 66 by means of a conductor 110, while the negative terminal of the transmitter section of power supply 64 is connected to one side of carrier operated relay 72 at relay terminal 111 by a conductor 112, relay terminal 113 at the other side of relay 72 being connected to the negative terminal of transmitter 66 through a conductor 114. Accordingly, the transmitter 66 is keyed on by closing of the carrier operated relay 72, and is turned off by opening of the relay 72.

The dial pulse contacts and hookswitch of a conventional telephone employing an antisidetone network like the network 62 normally in effect go to a pair of terminals represented by terminals 116 and 118 in FIG. 2. The effective opening and closing of an electrical connection between the terminals 116 and 118 is accomplished by the carrier operated relay 72. However, as there is no way of telling which polarity any given telephone line connection will have, the diode bridge 74 has been inserted between the terminals 116 and 118 on the one hand and the carrier operated relay 72 on the other hand, to assure that polarity will always be the same in the conductors leading from the bridge 74 to opposite sides of the carrier operated relay 72. With this arrangement, when the carrier operated relay 72 is open, there is no connection therethrough between the conductors 120 and 122, and in effect the antisidetone network terminals 116 and 118 are disconnected so that the telephone line is open. However, when the carrier operated relay is closed pursuant to the presence of a carrier wave from the portable unit 10, sensed through the base unit receiver 68, then the connection is made between conductors 120 and 122, and hence effectively between the antisidetone network terminals 116 and 118, to electrically connect the base unit to the telephone line.

Diodes 124 and 126 in the respective conductors 112 and 120 prevent interaction between the telephone line and the transmitter power supply 64, thus permitting a carrier relay 72 which has only single-pole, single-throw contacts to be used both to key the transmitter 66 and to connect the base unit to the telephone line.

Figure 3A:
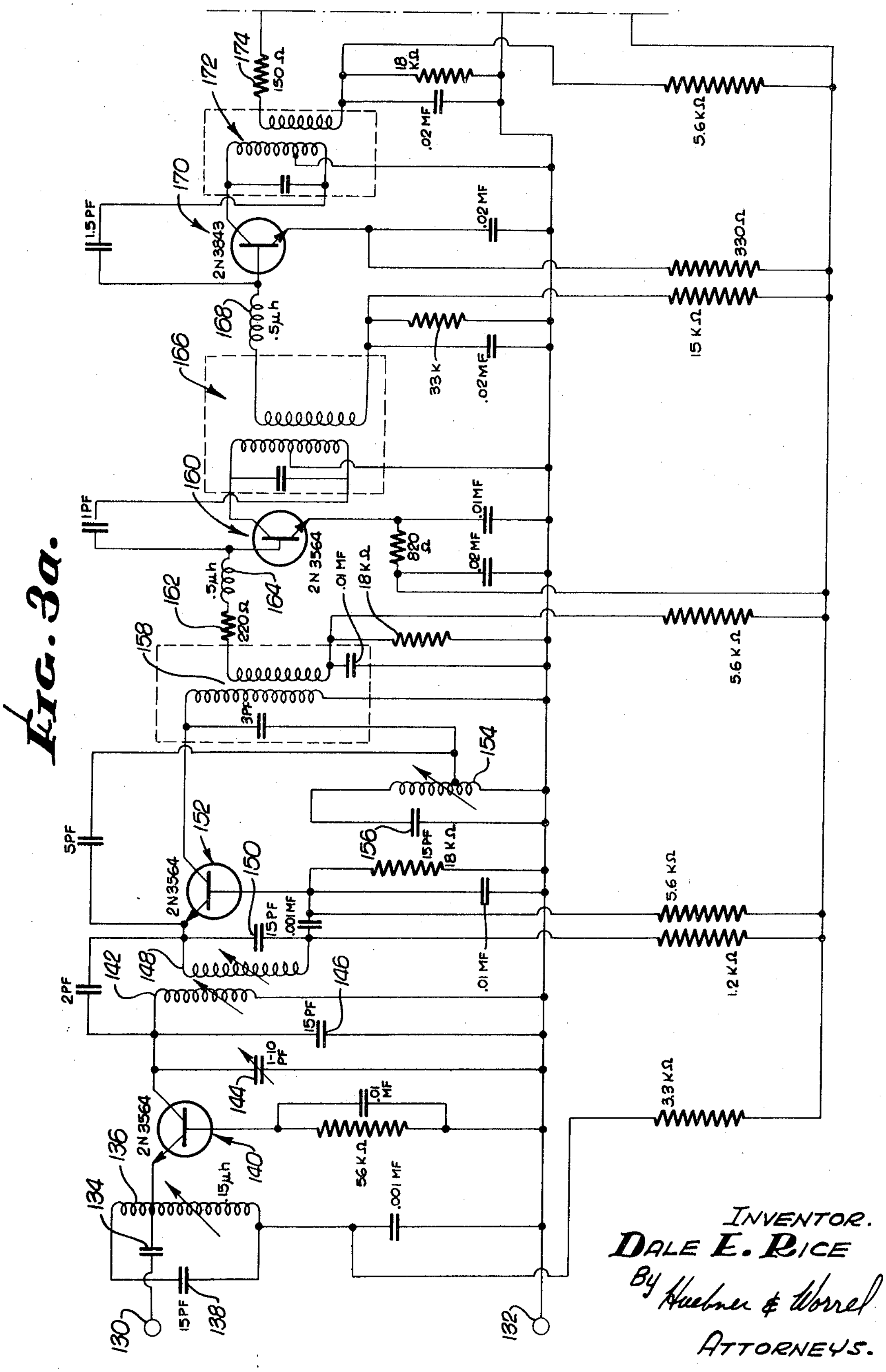
FIGS. 3*a* and 3*b* together comprise a wiring diagram of the base unit receiver, an identified portion of which also is a wiring diagram of the portable unit receiver.
Figure 3B:
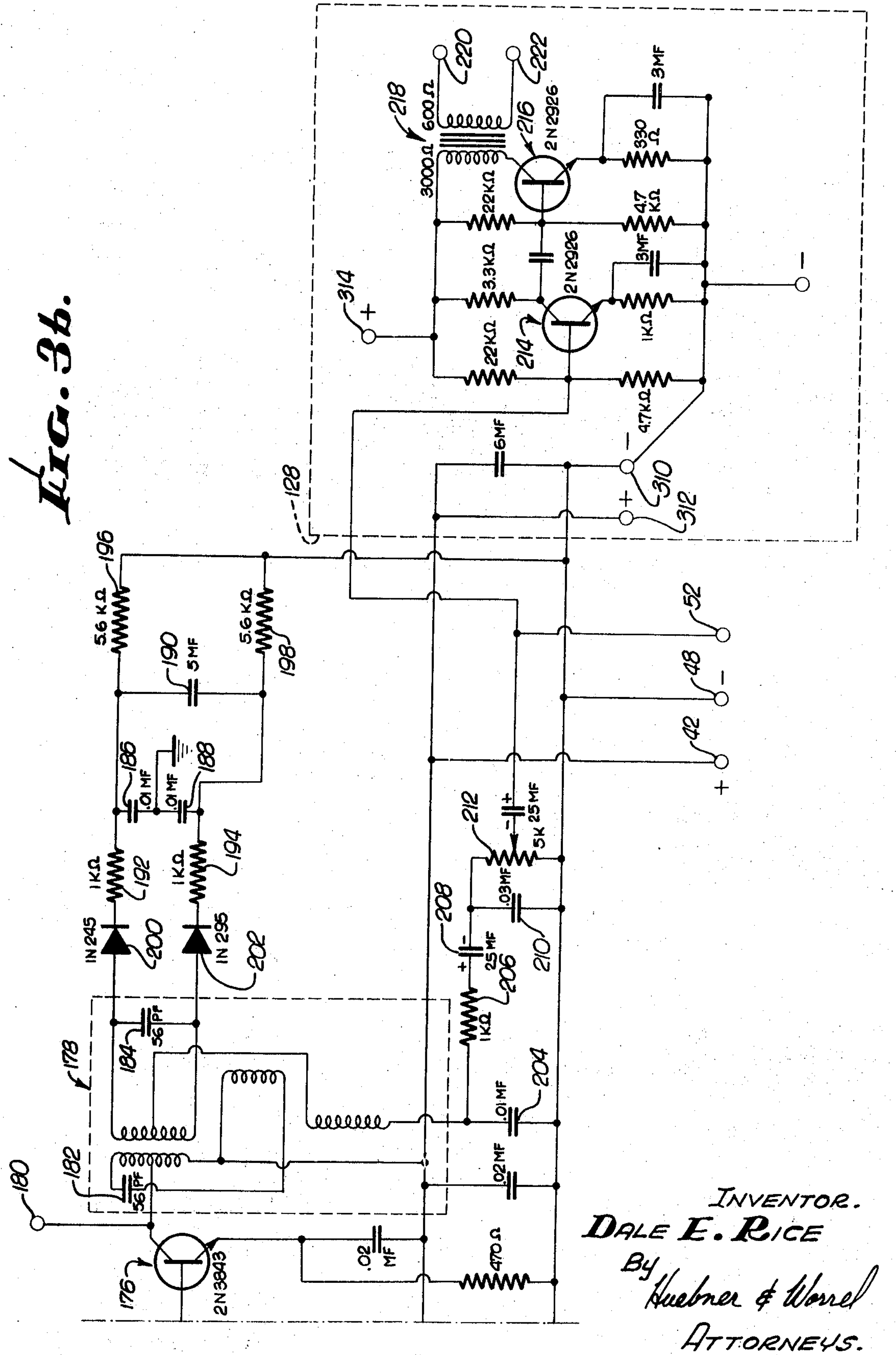

Reference will not be made to FIGS. 3*a* and 3*b*, which together disclose a complete wiring diagram of the base unit receiver 68. Since the voice output from the base unit receiver 68 is provided to the telephone line, it must have substantially higher amplitude than the voice output from the portable unit receiver 14, which is merely supplied to he local dynamic earphone element 32. Accordingly, additional voice power amplification is provided in the base unit receiver 68 by the added amplifier stages disposed within the dotted block designated 128 in FIG. 3*b;* while the receiver 14 of the portable unit may simply consist of the receiver circuitry shown to the left of dotted block 128 in FIGS. 3*a* and 3*b*.

The receiver illustrated in FIGS. 3*a* and 3*b* is a single conversion superheterodyne capable of receiving a frequency modulated (FM) signal in the range of about 80 to 110 megahertz. The incoming signal from the diplexer is applied across receiver input terminals 130 and 132, and thence through coupling capacitor 134 and an LC circuit consisting of inductor 136 and capacitor 138 resonant at the carrier frequency which, for the present description, will be assumed to be 88 mHz., to RF amplifier transistor 140. The RF amplifier 140 is a "common-base" amplifier the output of which is tuned to 88 mHz. by the combination of inductor 142 and capacitors 144 and 146, and coupled to a further resonant circuit consisting of inductor 148 and capacitor 150 also tuned to 88 mHz.

The signal is then applied to the emitter of transistor 152 which performs as a converter, mixing the input frequency of 88 mHz. with a frequency 10.7 mHz. lower in frequency as determined by the LC circuit consisting of inductor 154 and capacitor 156. The output from the converter transistor 152, which is a 10.7 mHz. signal, is applied to transformer 158 the primary of which is resonant at 10.7 mHz., and coupled to the base of first IF amplifier transistor 160 by resistor 162 and inductor 164.

The 10.7 mHz. signal is amplified by the first IF amplifier transistor 160 and fed to transformer 166 which is also resonant at 10.7 mHz., the secondary of transformer 166 being coupled through inductor 168 to transistor 170, the second IF amplifier, which further amplifies the signal and passes it to transformer 172 which in turn couples through resistor 174 to transistor 176. Transistor 176 acts as either a third IF amplifier stage or a saturated limiter, depending on the input signal level thereto. The output of transistor 176 drives ratio detector transformer 178, and also has output terminal 180 therefrom which provides the required power to energize the carrier operated relay 72 through conductor 106 and 108 as illustrated in FIG. 2.

The ratio detector transformer 178 and associated parts, capacitors 182, 184, 186, 188 and 190, resistors 192, 194, 196 and 198, and diodes 200 and 202, form a ratio detector centered at 10.7 mHz., and produce an audio output which is filtered and deemphasized by capacitor 204, resistor 206, capacitor 208 and capacitor 210, and fed to resistor 212 for level control. The plus and minus power terminals 42 and 48, respectively, and the audio output terminal 52, for the portable unit receiver 14 are shown at this point, just to the left of the dotted block 128, so as to illustrate the extent of the receiver circuit for the portable unit receiver 14. The remaining portion of the receiver 68 of the base unit, which is disposed within the dotted block 128 in FIG. 3*b*, consists of two common-emitter audio stages in tandem including transistors 214 and 216 which drive transformer 218 and preferably can supply up to +10 DBM of audio signal to the telephone line through audio output terminals 220 and 222 which, in FIG. 2, feed the T-pad 90 and thence the antisidetone network 62.

Figure 4:
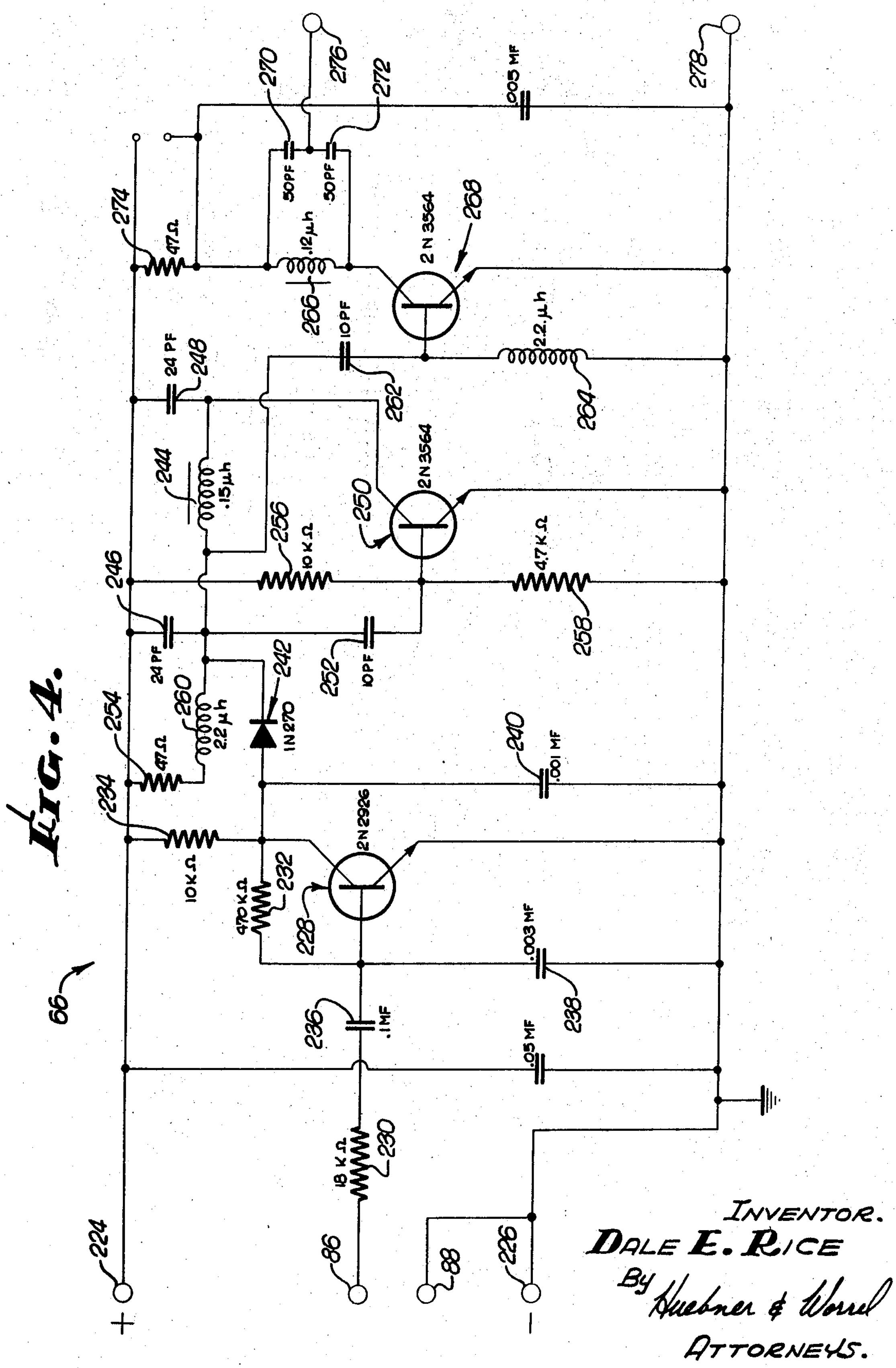
FIG. 4 is a transmitter wiring diagram suitable for both the base unit transmitter and the portable unit transmitter.

Reference will now be made to FIG. 4 which illustrates a suitable FM transmitter circuit for either the portable unit transmitter 12 or the base unit transmitter 66. However, for the purpose of the present description, the transmitter circuit illustrated in FIG. 4 will be considered to be the circuit for transmitter 66, which has audio input terminals 86 and 88 also shown in FIG. 2. Power is supplied through positive and negative power input terminals 224 and 226, respectively, the supply of power to the terminals 224 and 226 in the case of the base unit transmitter 66 being controlled by the carrier operated relay 72 as described in connection with FIG. 2, for keying of the transmitter 66.

The transmitter 66 uses a total of three transistors and one varicap diode to provide a frequency modulated signal preferably of about 65 milliwatts from a DC power input to the third transistor stage, which is a power amplifier, of about 100 milliwatts.

The input audio signal applied to terminals 86 and 88 is amplified and shaped by transistor 228, resistors 230, 232 and 234, and capacitors 236, 238 and 240. The audio signal is then applied to varicap diode 242 the capacity of which changes as a result of variations in the applied voltage. This capacity change modifies the LC constant of a resonant circuit consisting of inductor 244 and capacitors 246 and 248 and thereby applies frequency modulation to the oscillator stage.

The oscillator stage includes transistor 250, capacitors 246, 252 and 248, resistors 254, 256 and 258, and inductors 260 and 244. The resulting frequency modulated signal is then applied through capacitor 262 to a power amplifier stage consisting of inductors 264 and 266, transistor 268, capacitors 270 and 272, and resistor 274.

The output terminals 276 and 278 of transmitter 66 are connected to the diplexer 70 through conductors 98 and 100 as illustrated in FIG. 2.

The circuit components for the transmitter 66 are preferably of such values as to produce a transmitter output which is tunable from about 80 to about 110 mHz. It is preferred that the power output be approximately 65 milliwatts, but this is adjustable by proper choice of the coupling capacitor 262, and also by the voltage applied to the entire transmitter at power input terminals 224 and 226, which is preferably nominally 14 to 16 volts. The circuit components are also preferably selected to provide for about plus or minus 100 Kc.FM modulation with some incidental amplitude modulation.

Figure 5:
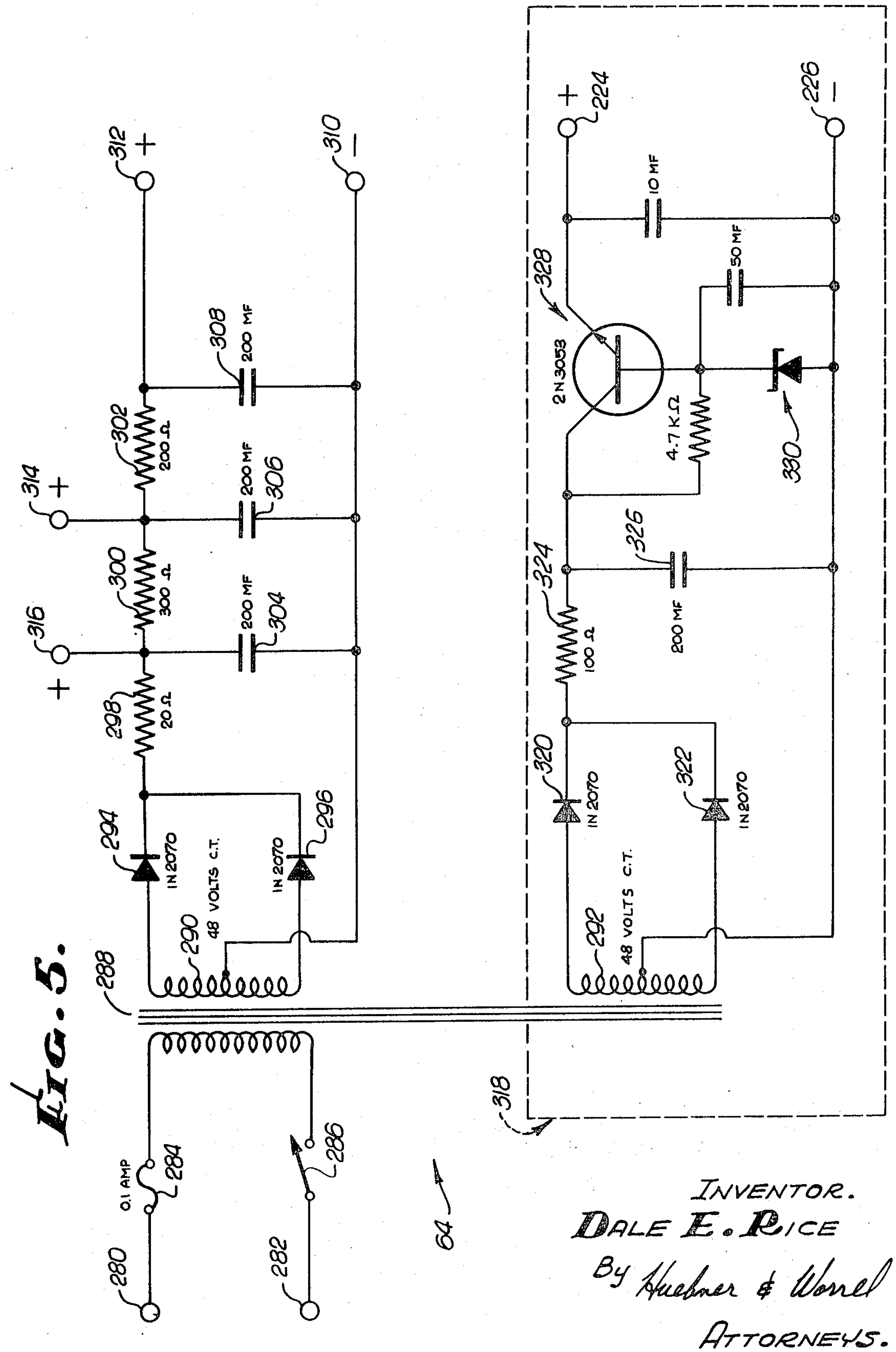
FIG. 5 is a wiring diagram for the base unit power supply.

Reference will now be made to FIG. 5, which illustrates suitable circuitry for the base unit power supply 64, which provides DC voltages necessary for the base unit transmitter 66, all sections of the base unit receiver 68, and the carrier operated relay 72.

The nominal 115-volt AC 60 cycle input is applied through input terminals 280 and 282, fuse 284 and on-off switch 286, to transformer 288 which has two 48-volt center-tapped secondaries 290 and 292. The output of transformer secondary 290 is rectified by diodes 294 and 296 to provide approximately 24 volts DC which is filtered and dropped to appropriate voltage levels by resistors 298, 300 and 302, and capacitors 304, 306 and 308 for the receiver and carrier operated relay. The negative output terminal for this section of the base unit power supply is designated by the numeral 310, which is also seen in FIG. 3*b* just to the right of the dotted line 128. The positive output terminal 312 in this section of the power supply provides approximately 10 volts DC to the RF and IF sections of the receiver, and is also seen in FIG. 3*b* just to the right of the dotted line 128. The positive output terminal 314 in this section of the power supply provides about 12 volts DC to the two common emitter audio stages of the receiver, and is also seen in FIG. 3*b* to the right of the dotted line 128. A further positive output terminal 316 in this section of the base unit power supply provides about 24 volts DC for energization of the carrier operated relay 72.

The transistor section of the base unit power supply is indicated generally by the reference numeral 318, and commences with the center-tapped secondary 292 of the transformer 288. The output of secondary 292 is rectified by diodes 320 and 322 and filtered by resistor 324 and capacitor 326. This output is regulated by a series regulator which includes transistor 328, the output voltage of which is nearly the same as Zener diode 330 which clamps the base of transistor 328, which preferably has a Zener voltage of about 15 volts. By this means, a stable output voltage of about 14 to 16 volts DC is provided at the transmitter power supply terminals 224 and 226, with the output current amplified by the transistor 328 in a well filtered, low impedance output.

Figure 6:
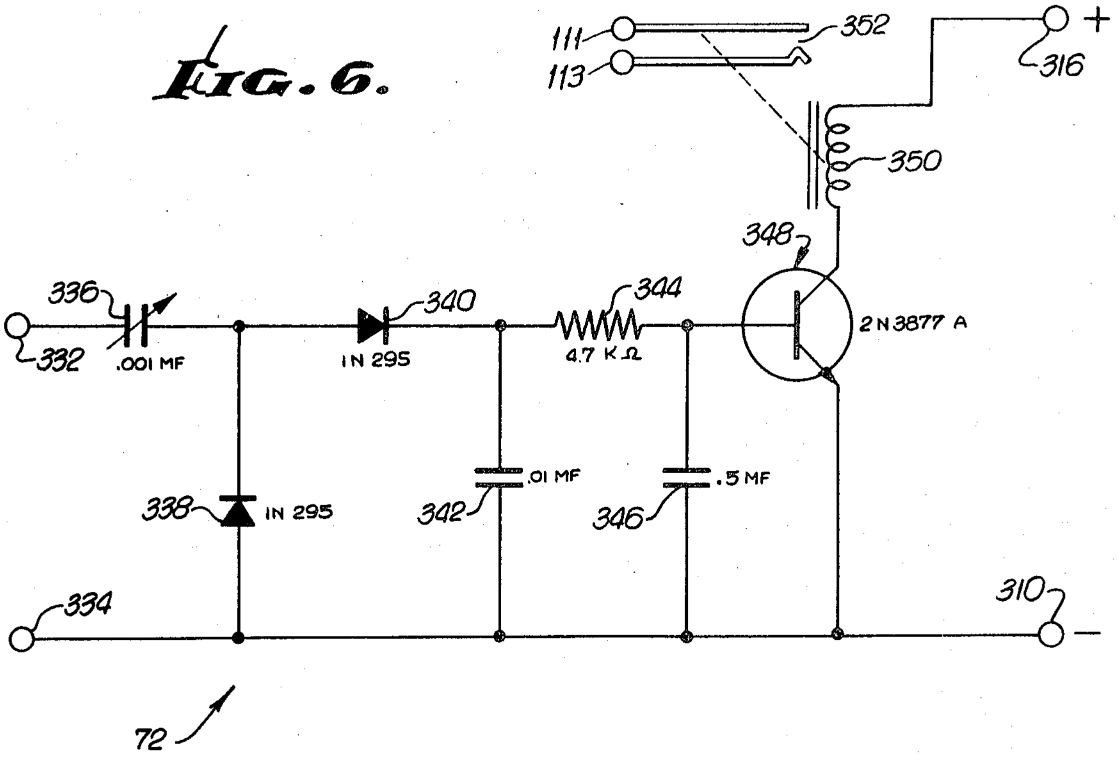
FIG. 6 is a wiring diagram for the carrier-operated relay circuit portion of the base unit.

Referring now to FIG. 6, which illustrates suitable circuitry for the carrier operated relay 72, the input terminal 332 of the relay is connected electrically to the output terminal 180 from the receiver IF section, shown at the left-hand side of FIG. 3*b*. This connection is made through one of the conductors 106 and 108 shown in FIG. 2, the other input terminal 334 being connected to the other conductor 106 or 108 in FIG. 2, which may be a ground connection, i.e., a connection to the negative terminal 310 of the power supply shown in FIG. 5.

Thus, whenever there is an RF carrier transmitted from the portable unit 10, there will be an IF voltage sampled at the receiver terminal 180 and applied across the relay input terminals 332 and 334. This signal is coupled through capacitor 336, is rectified by diodes 338 and 340, and is filtered by capacitor 342, resistor 344 and capacitor 346. The DC voltage at the junction of resistor 344 and capacitor 346 causes a current to flow in the base-emitter junction of transistor 348, whereby the transistor 348 in effect switches on to provide actuation current through the relay coil 350, thus closing the relay contacts 352 that are connected to the two relay output terminals 111 and 113.

The amount of signal from the receiver that is necessary to operate the relay 72 may be varied by adjusting the value of the capacitor 336, if desired.

Figure 7:
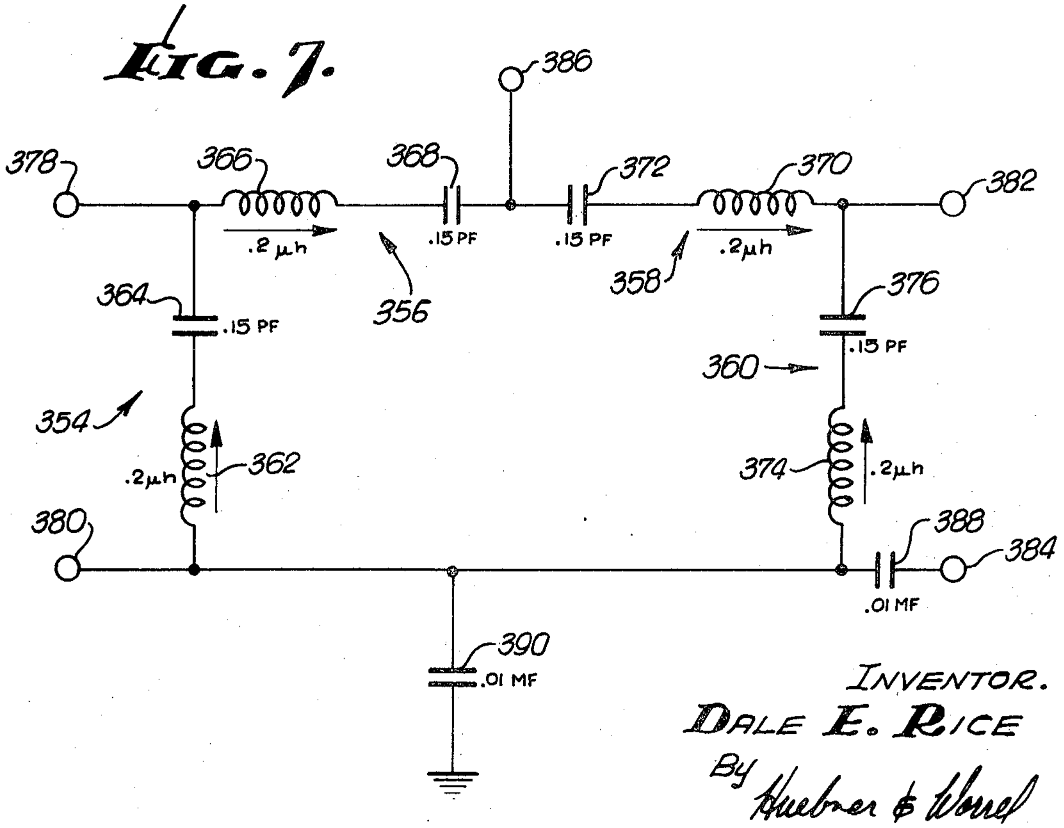
FIG. 7 is a wiring diagram of the diplexer circuit used in both the base unit and the portable unit.

Reference will now be made to FIG. 7, which illustrates a suitable circuit arrangement for either the diplexer 16 of the portable unit or the diplexer 70 of the base unit. The diplexer represents a physical embodiment of a frequency separation scheme enabling both the transmitter and receiver outputs of either the portable unit or the base unit to be coupled to a single antenna without interaction between the transmitter and receiver. The transmitter and receiver for either the portable unit 10 or the base unit 56 are, of course, on different carrier frequencies, and it is this frequency difference which is utilized for the separation in the diplexer circuit illustrated in FIG. 7.

The circuit of FIG. 7 consists of four series resonant LC circuits generally designated by the reference numerals 354, 356, 358 and 360. LC circuit 354 includes inductor 362 and capacitor 364; LC circuit 356 includes inductor 366 and capacitor 368; LC circuit 358 includes inductor 370 and capacitor 372; and LC circuit 360 includes inductor 374 and capacitor 376. The transmitter output terminals 378 and 380 are applied across the LC circuit 354, while the receiver input terminals 382 and 384 are connected across the LC circuit 360. The LC circuits 356 and 358 are series-connected between the transmitter output terminal 378 and the receiver input terminal 382, and the antenna terminal 386 is connected between the LC circuits 356 and 358.

The LC circuit 354 which is disposed across the transmitter output terminals 378 and 380 is tuned to the receiver input frequency, and traps any noise on this frequency which might be put out by the transmitter, preventing such from being seen at the receiver input. On the other hand, LC circuit 360 across the receiver input terminals 382 and 384 traps any residual voltage on the transmit frequency at the receiver input capacitors which, in FIG. 7, are designated as 388 and 390, to provide DC isolation between the transmitter and receiver modules. The LC circuit 356 provides a low impedance signal path from the transmitter output terminal 378 to the antenna terminal 386; while the LC circuit 358 provides a low impedance signal path for the receiver frequency from the antenna terminal 386 to the receiver input terminal 382.

Although no ringer circuitry has been shown in the accompanying drawings, it is to be understood that conventional ringer means may be associated with the telephone line in the base unit without in any way interfering with the application of the present invention to the line. In such case, ringing would occur in direct connection with the base unit. Alternatively, if desired, carrier sampling circuitry may be included in the portable unit to sense the presence of ringing impulses via RF signal from the base unit and to sound a ringer located in the portable unit. Such carrier sampling involves operation of the portable unit receiver but not the portable unit transmitter, for conservation of battery power.

While detailed circuit arrangements for the various modules embodied in a presently preferred form of the invention have been illustrated and described herein, it is to be understood that such details are presented by way of example only, so as to disclose a complete working embodiment of the invention, and are not presented by way of limitation. Thus, various frequencies, voltages, polarities and power ratings discussed hereinabove, as well as detailed circuit components and their values illustrated in the drawings, are given by way of example and not of limitation, and it is to be understood that various circuits and circuit components disclosed herein may be replaced by equivalent circuits and components without departing from the present invention. As an example of such a possible substitution of equivalent means, although FM transmitters and receivers have been shown and described herein as a presently preferred type of transmitter and receiver equipment, it is to be understood that AM transmitters and receivers may alternatively be employed without departing from the present invention.

Accordingly, the present invention is not to be limited to the various details disclosed herein but is to be accorded the full scope of the appended claims.

I claim:

1. A cordless telephone system which includes a base unit and a portable unit; said base unit comprising normally open telephone line connection circuit means comprising an anti-sidetone network, an RF transmitter connected to said circuit means to receive telephone line audio signal therefrom and adapted to transmit a first RF signal modulated with said line audio signal, an RF receiver connected to said circuit means to provide subscriber audio signal thereto and adapted to receive a second RF signal modulated with subscriber audio signal, and switching circuit means connected to said connection circuit means and to said transmitter and operable in response to reception of said second RF signal in said receiver to close said connection circuit means and key on the transmitter; said portable unit comprising an RF transmitter adapted to transmit said second RF signal, a receiver adapted to receive said first RF signal, and switch means connected to the portable unit transmitter and receiver and selectively operable to key on the portable unit transmitter and energize the portable unit receiver, said switching circuit means being connected to said telephone line connection circuit means through a diode polarization bridge circuit presenting the same electrical polarity to the switching circuit means regardless of telephone line polarity.

2. A cordless telephone system which includes a base unit and a portable unit; said base unit comprising normally open telephone line connection circuit means comprising an anti-sidetone network, an RF transmitter connected to said circuit means to receive telephone line audio signal therefrom and adapted to transmit a first RF signal modulated with said line audio signal, an RF receiver connected to said circuit means to provide subscriber audio signal thereto and adapted to receive a second RF signal modulated with subscriber audio signal, and switching circuit means connected to said connection circuit means and to said transmitter and operable in response to reception of said second RF signal in said receiver to close said connection circuit means and key on the transmitter; said portable unit comprising an RF transmitter adapted to transmit said second RF signal, a receiver adapted to receive said first RF signal, and switch means connected to the portable unit transmitter and receiver and selectively operable to key on the portable unit transmitter and energize the portable unit receiver, said switching circuit means comprising normally open relay means having energizing circuit means electrically connected to said base unit receiver so as to be energized and closed in response to the reception of said second RF signal in said base unit receiver, said base unit receiver being of the superheterodyne type, and said electrical connection between said energizing circuit means of the relay means and the base unit receiver being to IF means in the receiver.

3. A cordless telephone system which includes a base unit and a portable unit; said base unit comprising normally open telephone line connection circuit means comprising an antisidetone network, an RF transmitter connected to said circuit means to receive telephone line audio signal therefrom and adapted to transmit a first RF signal modulated with said line audio signal, an RF receiver connected to said circuit means to provide subscriber audio signal thereto and adapted to receive a second RF signal modulated with subscriber audio signal, and switching circuit means connected to said connection circuit means and to said transmitter and operable in response to reception of said second RF signal in said receiver to close said connection circuit means and key on the transmitter; said portable unit comprising an RF transmitter adapted to transmit said second RF signal, a receiver adapted to receive said first RF signal, and switch means connected to the portable unit transmitter and receiver and selectively operable to key on the portable unit transmitter and energize the portable unit receiver, said switching circuit means comprising normally open relay means having energizing circuit means electrically connected to said base unit receiver so as to be energized and closed in response to the reception of said second RF signal in said base unit receiver, said base unit including transmitter power supply means operably connectable with said base unit transmitter through said relay means to key on the transmitter, said relay means being connected to said telephone line connection circuit means through a diode polarization bridge circuit presenting the same electrical polarity to the relay means regardless of the telephone line polarity.

4. A cordless telephone system as defined in claim 3, wherein said relay means embodies single-pole single-throw contact means for both closing said telephone line connection circuit means and keying on the base unit transmitter by connecting said power supply means to the transmitter.

5. A cordless telephone system as defined in claim 4, which includes isolation diode means in at least one of the connections between said relay means on the one hand and said telephone line connection circuit means and said power supply means on the other hand, to prevent interaction between said power supply means and the telephone line.

* * * * *